(12) United States Patent
Leonarski

(10) Patent No.: US 12,489,347 B2
(45) Date of Patent: Dec. 2, 2025

(54) ELECTRICAL MACHINES WITH SEGMENTED INVERTER COMPONENTS

(71) Applicant: Cummins Inc., Columbus, IN (US)

(72) Inventor: Jaroslaw Leonarski, Columbus, IN (US)

(73) Assignee: Cummins Inc., Columbus, IN (US)

( * ) Notice: Subject to any disclaimer, the term of this patent is extended or adjusted under 35 U.S.C. 154(b) by 146 days.

(21) Appl. No.: 18/281,883

(22) PCT Filed: Feb. 24, 2022

(86) PCT No.: PCT/US2022/017610
§ 371 (c)(1),
(2) Date: Sep. 13, 2023

(87) PCT Pub. No.: WO2022/197413
PCT Pub. Date: Sep. 22, 2022

(65) Prior Publication Data
US 2024/0154503 A1 May 9, 2024

Related U.S. Application Data

(60) Provisional application No. 63/161,051, filed on Mar. 15, 2021.

(51) Int. Cl.
*H02P 5/74* (2006.01)
*H02K 1/16* (2006.01)
(Continued)

(52) U.S. Cl.
CPC ............. *H02K 11/33* (2016.01); *H02K 1/16* (2013.01); *H02P 27/06* (2013.01); *H02K 2213/06* (2013.01); *H02K 2213/09* (2013.01)

(58) Field of Classification Search
CPC .. H02K 1/16; H02K 2213/06; H02K 2213/09; H02K 2203/09; H02P 27/06;
(Continued)

(56) References Cited

U.S. PATENT DOCUMENTS 4,743,828 A * 5/1988 Jahns ..................... B63H 21/17
363/43
5,414,339 A 5/1995 Masaki
(Continued)

FOREIGN PATENT DOCUMENTS

| | | |
|---|---|---|
| DE | 102015219476 A1 | 12/2016 |
| JP | 2004023877 A | 1/2004 |
| WO | 2014207858 A1 | 12/2014 |

OTHER PUBLICATIONS

International Search Report and Written Opinion for International patent application No. PCT/US2022/017610, filed Feb. 24, 2022, mailed Jul. 26, 2022.
(Continued)

*Primary Examiner* — Muhammad S Islam
(74) *Attorney, Agent, or Firm* — Faegre Drinker Biddle & Reath LLP

(57) ABSTRACT

Electric machines, as well as systems implementing the same and methods of controlling the same, are disclosed. The electric machine includes a stator with a plurality of slots and a plurality of segmented inverter components coupled with the plurality of slots of the stator. Each segmented inverter component has an inverter and a set of windings extending from the inverter. The windings are inserted into a portion of the slots, and each of the segmented inverter components is separately and independently operable.

18 Claims, 13 Drawing Sheets

(51) Int. Cl.
*H02K 11/33* (2016.01)
*H02P 27/06* (2006.01)

(58) Field of Classification Search
CPC .......... H02P 6/08; H02P 7/348; H02P 25/188;
H02P 25/22; H02P 2205/05; H02M
1/0032; H02M 1/325; H02M 1/327;
H02M 7/5387; H02M 7/53873
See application file for complete search history.

(56) References Cited

U.S. PATENT DOCUMENTS

| | | | |
|---|---|---|---|
| 7,023,171 | B2 | 4/2006 | Su et al. |
| 7,898,126 | B2 | 3/2011 | Kato et al. |
| 8,564,238 | B2 | 10/2013 | Meynard |
| 10,063,180 | B2 | 8/2018 | Wang et al. |
| 10,581,361 | B2 | 3/2020 | Chen et al. |
| 10,693,408 | B2 | 6/2020 | Obry et al. |
| 11,177,761 | B1 * | 11/2021 | Kabir ................... H02P 27/06 |
| 2003/0173839 | A1 | 9/2003 | Torii |
| 2003/0178896 | A1 | 9/2003 | Crane |
| 2004/0027014 | A1 | 2/2004 | Weigold |
| 2006/0002054 | A1 | 1/2006 | Anwar |
| 2012/0112608 | A1 | 5/2012 | Chamberlin |
| 2016/0156253 | A1 | 6/2016 | Owen |
| 2017/0229993 | A1 | 8/2017 | Obry et al. |
| 2019/0058364 | A1 | 2/2019 | Mao |
| 2019/0318878 | A1 | 10/2019 | Owen |
| 2020/0120786 | A1 | 4/2020 | Sotome et al. |
| 2020/0144952 | A1 | 5/2020 | Mao |
| 2022/0052626 | A1 * | 2/2022 | Xue ................... H02M 7/5387 |
| 2024/0154503 | A1 * | 5/2024 | Leonarski .............. H02K 11/33 |

OTHER PUBLICATIONS

Supplementary partial European Search Report and Written Opinion for EP22771906.9, mailed Jan. 29, 2025.
Alosa C et al. "Reconfigurable Mutli-Three Phase Propulsion System for Naval Rim-Driven Propeller" 2020 International Symposium on Power Electronics, Electrical Drives, Automation and Motion (Speedam), IEEE, Jun. 24, 2020, pp. 442-447, XP033803024.
Supplementary European Search Report and Written Opinion for EP 22771906.9, mailed Apr. 4, 2025.

* cited by examiner

300

400

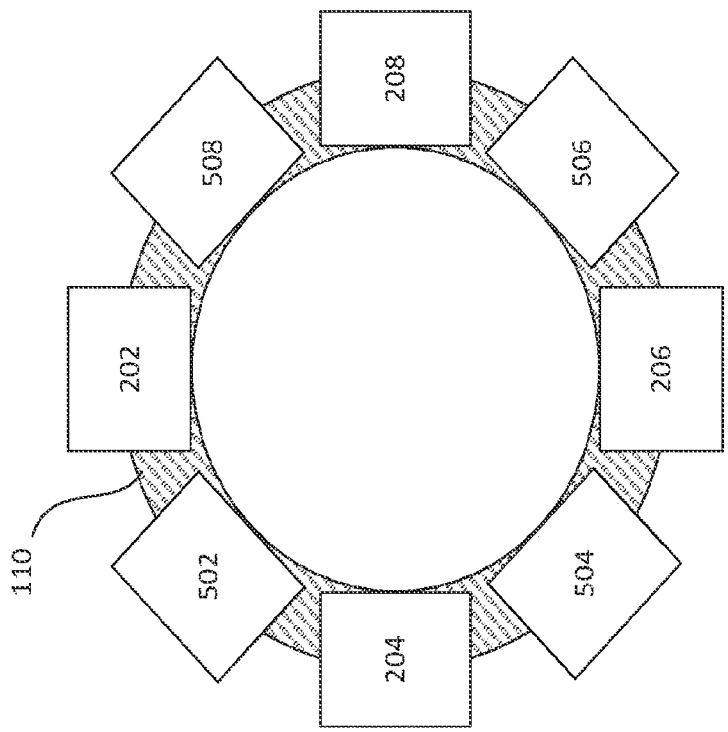
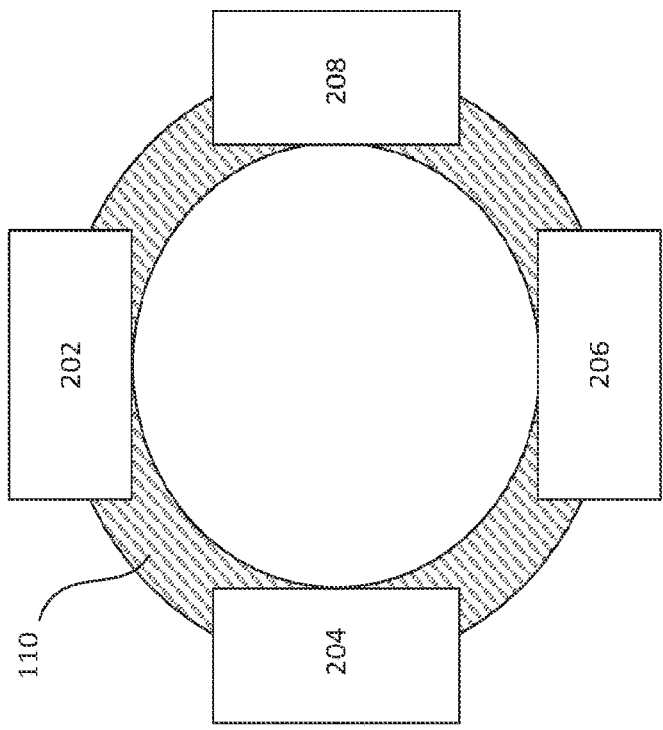

500

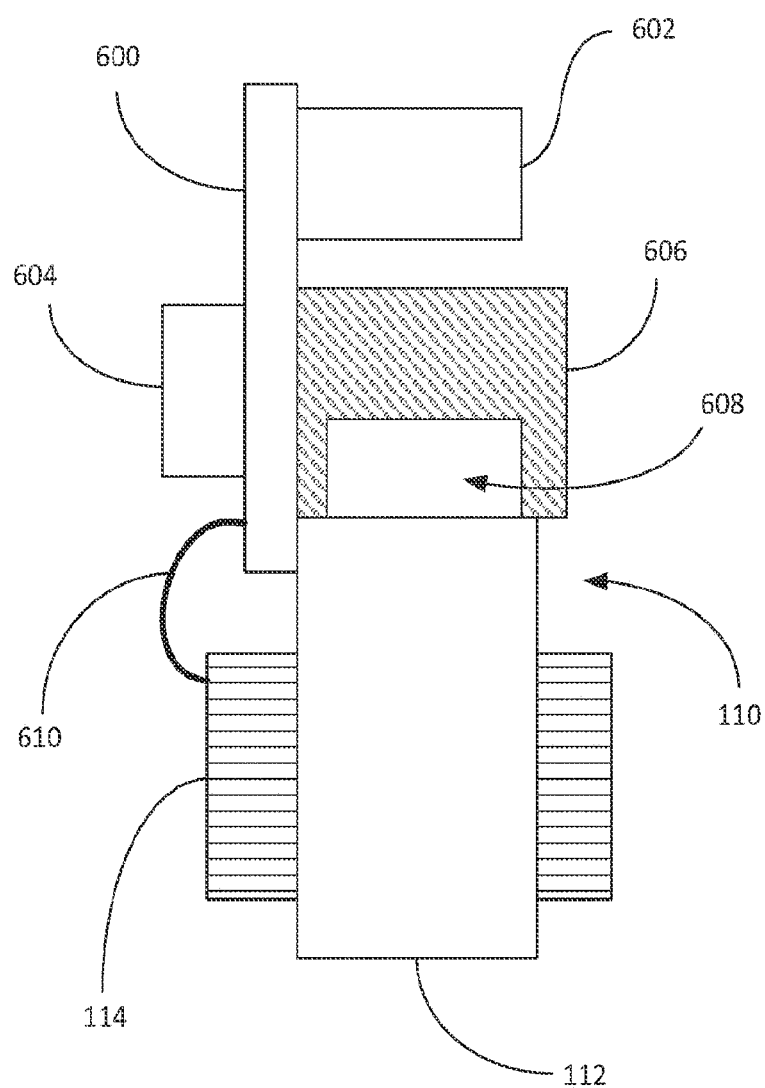

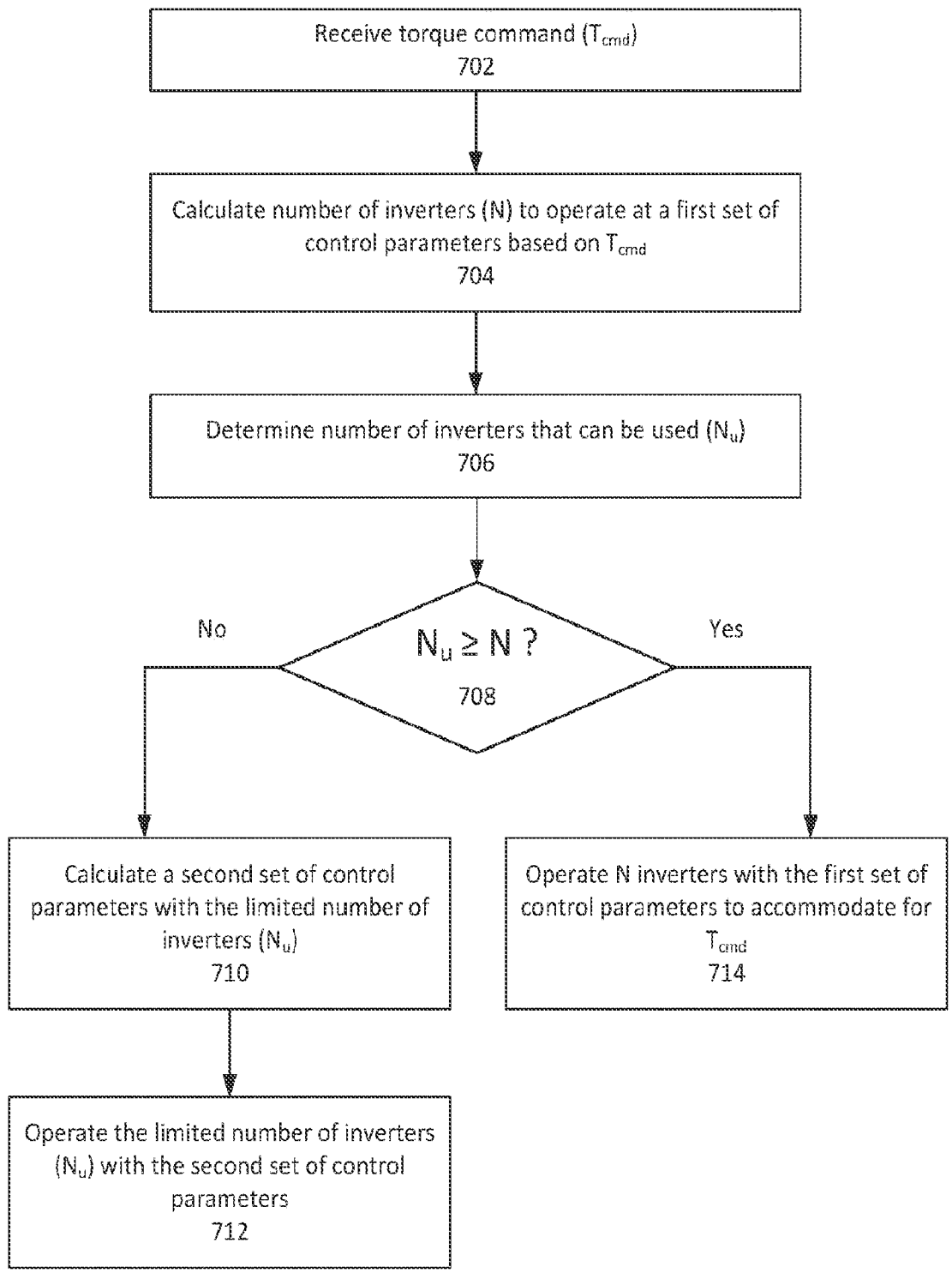

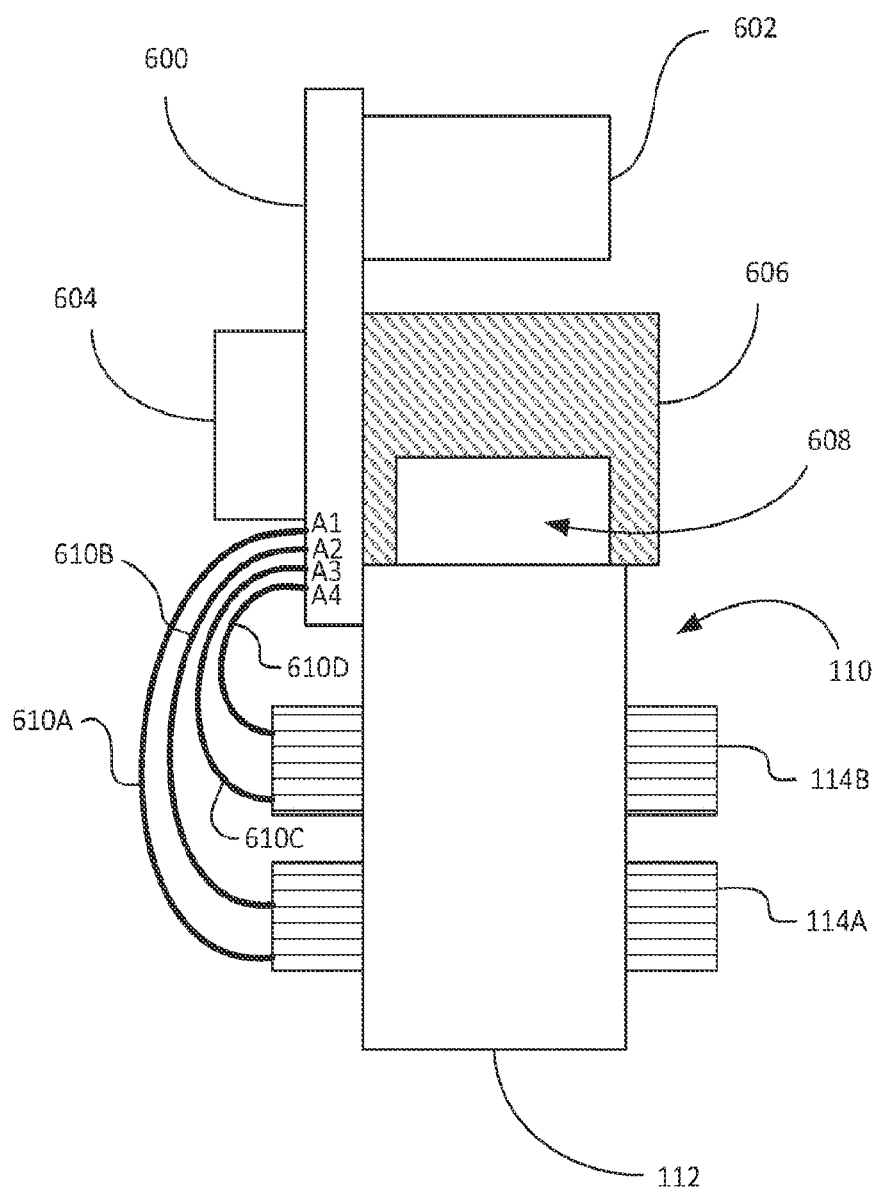

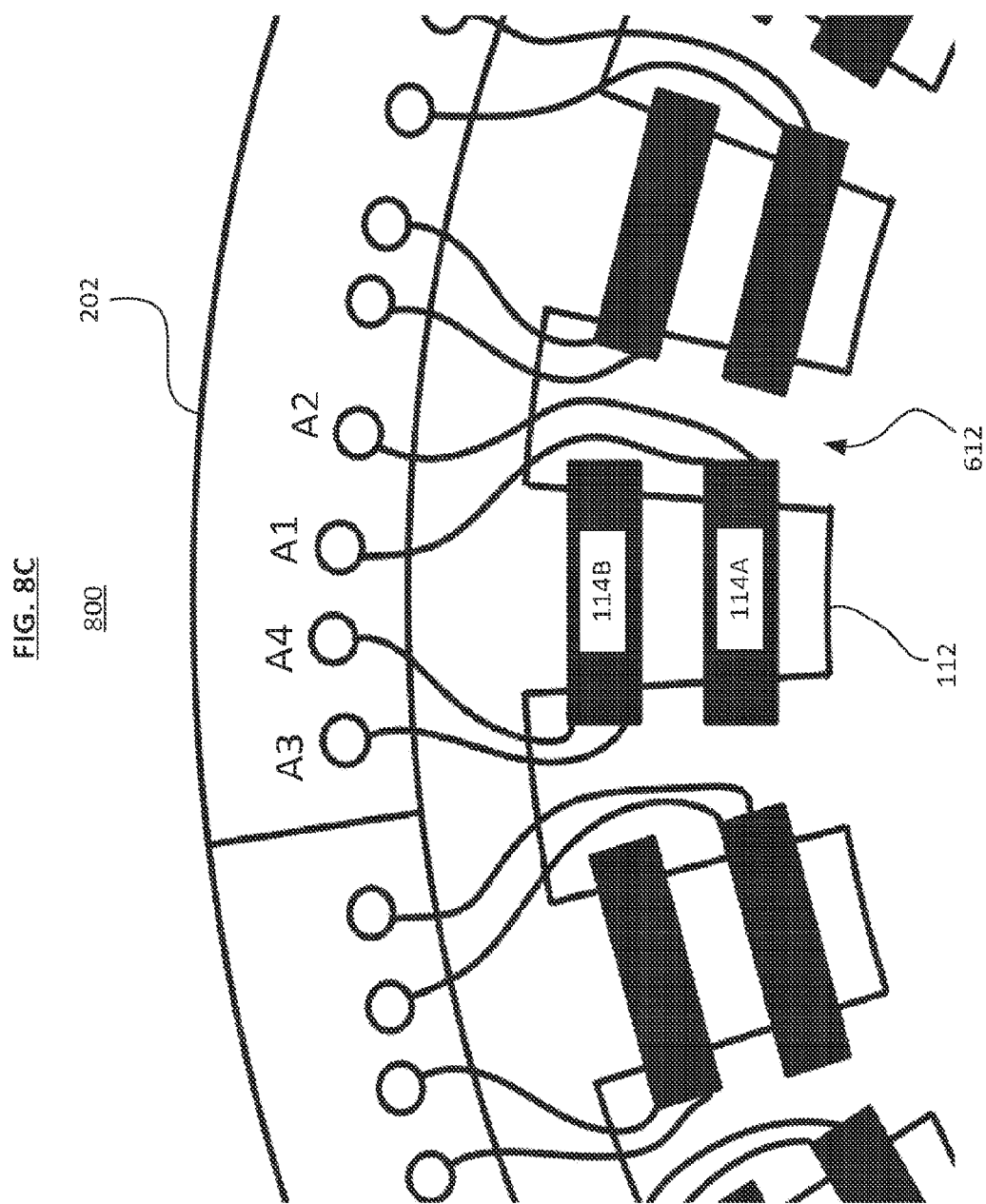

Dual Windings Machine Torque

ELECTRICAL MACHINES WITH SEGMENTED INVERTER COMPONENTS

CROSS-REFERENCE TO RELATED APPLICATION

This application claims priority to and is a U.S. national stage application of International Patent Application No. PCT/US2022/017610, filed Feb. 24, 2022, which claims priority to U.S. Provisional Application No. 63/161,051, filed on Mar. 15, 2021, the disclosures of which are hereby incorporated herein by reference in their entirety.

FIELD OF THE DISCLOSURE

The present disclosure relates generally to electric machines and more specifically to multiphase electric machines.

BACKGROUND OF THE DISCLOSURE

Multiphase electric machines, such as three-phase induction motors or generators, implement a plurality of coil windings that are wound around the teeth of the stator to form separate poles. The coil windings on certain poles are synchronized so as to provide the same magnetic polarity, forming a rotating magnetic field to cause rotation in the rotor that is coupled with the stator. Each of the coil windings is electrically coupled with a power inverter such that the inverter converts the DC power provided by a DC energy source to AC power to be used to control the polarity of the poles. However, the inverter typically uses power cables and connectors to electrically couple the individual inverter legs with the switches to each of the coil windings, which would not only increase cost of manufacturing the electric machines and the physical size of the electric machines, but the electric machines may also experience higher power losses through the power cables and connectors. Furthermore, the transistors implemented in the inverter would require higher current rating to endure the increased current flow through the power cables and connectors, since the AC power needs to be distributed to a plurality of coil windings. Accordingly, further contributions are needed in this area of technology to reduce the use of such power cables and connectors in coupling the inverter with the coil windings.

SUMMARY OF THE DISCLOSURE

According to the present disclosure, an electric machine includes a stator with a plurality of slots and a plurality of segmented inverter components coupled with the plurality of slots of the stator. Each segmented inverter component has an inverter and a set of coil windings extending from the inverter. The windings are inserted into a portion of the slots, and each of the segmented inverter components is separately and independently operable. In some examples, the electric machine has a positive DC connection ring and a negative DC connection ring. The positive DC connection ring electrically couples each of the segmented inverter components with a positive DC terminal of an energy source, and the negative DC connection ring electrically couples each of the segmented inverter components with a negative DC terminal of the energy source. In some examples, each of the segmented inverter components includes a printed circuit board (PCB) to which the windings are electrically coupled as well as a coolant jacket coupled with the PCB. The coolant jacket includes a coolant channel. In some examples, the PCB comprises a plurality of power transistors and control hardware electronics configured to control functionality of the inverter. In some examples, each of the segmented inverter components is removably attached to the stator. In some examples, each of the segmented inverter components is separately powered by a plurality of energy storage devices.

The present disclosure also pertains to an electric machine system which includes and operates the electric machine. The system includes, in addition to the electric machine, a plurality of inverter sub-controllers operatively coupled with the inverters of the plurality of segmented inverter components, as well as master controller operatively coupled with the plurality of inverter sub-controllers. In some examples, the master controller receives a torque command for the electric machine, calculates a number of required inverters to use and a first set of control parameters based on the torque command, determines a number of available inverters, and in response to determining that the number of available inverters is equal to or greater than the number of required inverters, operates at least a portion of the segmented inverter components using the inverter sub-controllers with the first set of control parameters to accommodate for the torque command.

In some examples, in response to determining that the number of available inverters is less than the number of required inverters, the master controller calculates a second set of control parameters based on the number of available inverters, and operates at least a portion of the segmented inverter components using the inverter sub-controllers with the second set of control parameters. In some examples, the system further includes a plurality of energy storage devices operatively coupled with the segmented inverter components such that each of the segmented inverter components is separately powered by a plurality of energy storage devices.

In some examples, the system further includes at least one energy source with a positive DC terminal and a negative DC terminal. The electric machine further includes a positive DC connection ring configured to electrically couple each of the segmented inverter components with the positive DC terminal of the energy source and a negative DC connection ring configured to electrically couple each of the segmented inverter components with the negative DC terminal of the energy source. In some examples, each of the segmented inverter components of the system includes a PCB to which the windings are electrically coupled and a coolant jacket coupled with the PCB including a coolant channel. In some examples, the PCB comprises a plurality of power transistors and control hardware electronics configured to control functionality of the inverter, the control hardware electronics defining the inverter sub-controller. In some examples, each of the segmented inverter components is configured to be removably attached to the stator. In some examples, the set of coil windings include at least a first coil winding and a second coil winding each disposed around a common stator tooth such that the first coil winding is disposed distally along the common stator tooth with respect to the second coil winding. In some examples, the inverter is configured such that the first and second coil windings are capable of forming either (a) a series connection of dual coils or (b) a parallel connection of dual coils.

Further disclosed herein are methods of operating an electric machine. The method includes: receiving, by a master controller, a torque command for the electric machine, the electric machine including a plurality of segmented inverter components, each including an inverter and a set of windings extending from the inverter, each of the segmented inverter components being separately and independently operable; calculating, by the master controller, a number of required inverters to use and a first set of control parameters based on the torque command; determining, by the master controller, a number of available inverters; and in response to determining that the number of available inverters is equal to or greater than the number of required inverters, operating, by the master controller using the inverter sub-controllers, at least a portion of the segmented inverter components with the first set of control parameters to accommodate for the torque command.

In some examples, the method further includes: in response to determining that the number of available inverters is less than the number of required inverters, calculating a second set of control parameters based on the number of available inverters; and operating, by the master controller using the inverter sub-controllers, at least a portion of the segmented inverter components with the second set of control parameters.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The detailed description of drawings particularly refers to the accompanying figures in which:

FIGS. 5A and 5B are schematic diagrams of a multiphase electric machine with different numbers segmented inverter subcomponents installed on the stator according to embodiments disclosed herein;

FIG. 6B is a cross-sectional view of a portion of the stator and the segmented inverter subcomponent as implemented in the multiphase electric machine of FIG. 6A according to embodiments disclosed herein;

FIG. 7 is a flow diagram of a method of controlling the segmented inverter subcomponents according to embodiments disclosed herein;

FIG. 8B is a cross-sectional view of a portion of the stator and the segmented inverter subcomponent as implemented in the dual-winding multiphase electric machine of FIG. 8A according to embodiments disclosed herein;

FIG. 8C is an expanded view of a portion of the dual-winding multiphase electric machine as disclosed in FIG. 8A;

DETAILED DESCRIPTION

The embodiments of the disclosure described herein are not intended to be exhaustive or to limit the disclosure to the precise forms disclosed. Rather, the embodiments selected for description have been chosen to enable one skilled in the art to practice the disclosure.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example.

Figure 1:
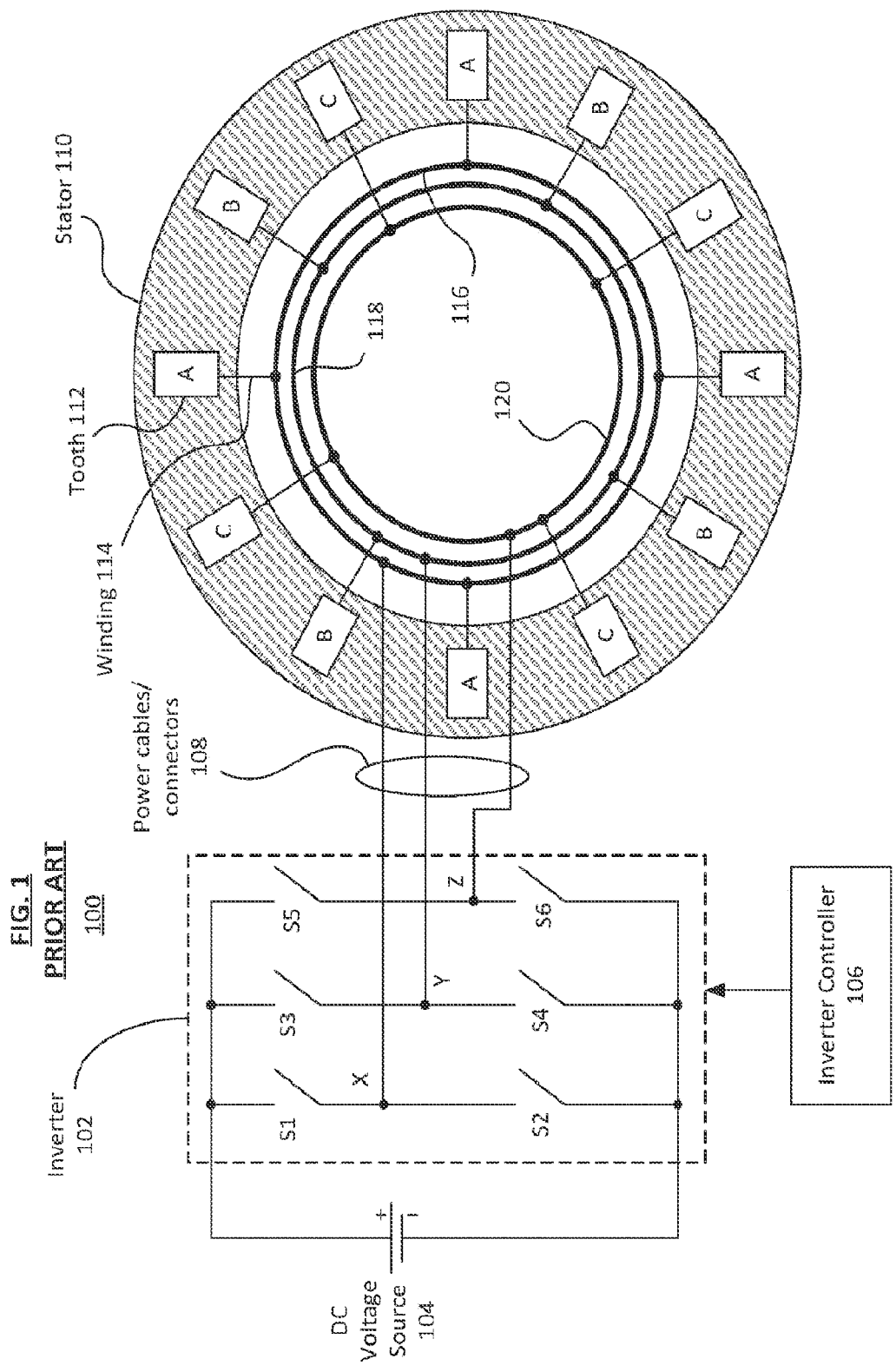
FIG. 1 is a schematic diagram of a prior-art three-phase electric machine with an inverter coupled to the coil windings via power cables and connectors, as previously known in the art.

FIG. 1 shows an example of a prior-art electric machine 100 such as a motor which includes an inverter 102, a DC voltage source 104, an inverter controller 106 that controls the inverter 102, a set of power cables and connectors 108, and a stator 110 that is powered by the inverter 102. For simplicity, the rotor of the electric machine 100 is not shown. The inverter controller 106 operates the inverter 102 by controlling switches S1 through S6. Switches S1 and S2 are coupled to connector X, switches S3 and S4 are coupled to connector Y, and switches S5 and S6 are coupled to connector Z. The connectors X, Y, and Z are contained in the power cables 108 and are coupled to one of the three connection rings 116, 118, and 120. In the configuration as shown, the connection ring 116 is coupled to the connector X, the connection ring 118 is coupled to the connector Y, and the connection ring 120 is coupled to the connector Z. Each connection ring is in turn coupled to multiple coil windings 114.

In the example as shown, the inverter 102 is a three-phase inverter, so there are three sets of windings: A, B, and C. Each individual coil winding 114 is formed by wrapping a coil around a tooth 112 of the stator 110 to constitute an inductor. For simplicity, the neutral point connections of the windings are not shown. Due to being connected by the connection rings 116, 118, and 120, all windings with the common label (A, B, or C) are activated simultaneously such that current flows in the same direction in each of the windings. If the number of phases in the inverter 102 is different, the number of the connection rings as implemented also changes; for example, there would be six connection rings for a six-phase inverter instead of three as shown. As such, the increase in the number of connections rings as well as in the number of power cables 108 connecting the connection rings to the inverter 102 would cause the physical size of the electric machine 100 to increase.

Figure 2:
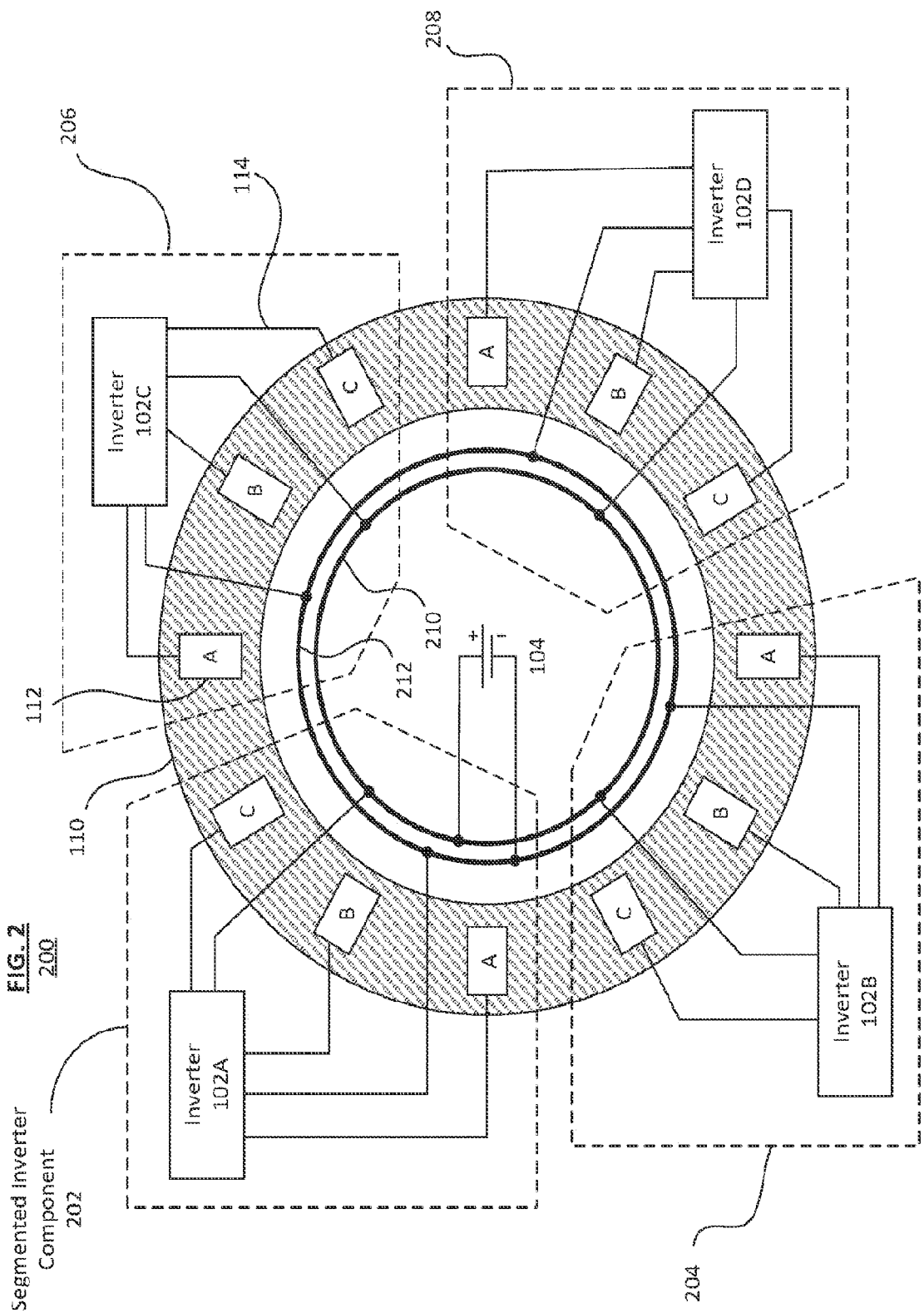
FIG. 2 is a schematic diagram of a multiphase electric machine with segmented inverter components installed on the stator according to embodiments disclosed herein.

FIG. 2 shows an example of a multiphase electric machine 200 according to embodiments disclosed herein. The electric machine 200 has a plurality of modular or segmented inverter components 202, 204, 206, and 208. The segmented inverter components are installed on the stator 110 such that each segmented inverter component has an inverter 102A, 102B, 102C, or 102D electrically coupled with a set of neighboring teeth 112 (also referred to as poles) in the stator 110. The inverters 102A through 102D may have any suitable number of phases, but for simplicity, the inverters are illustrated as three-phase inverters, thus coupling with three separate coil windings A, B, and C (using coils 114) in each segmented inverter component 202.

The electric machine 200 further includes a DC voltage source 104 which may be an energy storage device such as a battery, and two DC connection rings: a positive DC connection ring 210 and a negative DC connection ring 212. The positive DC connection ring is electrically coupled to a positive terminal of the voltage source 104, and the negative DC connection ring is electrically coupled to a negative terminal of the voltage source 104. In some examples, the voltage source 104 may include a plurality of energy storage devices coupled or connected together to provide additional DC voltage in series connection. Each of the DC connection rings 210 and 212 is electrically coupled with all of the inverters 102A through 102D, and the inverters are controlled to determine which of the coil windings A, B, and C receives the electrical current. For simplicity, the neutral point connections of the windings are not shown.

In some examples, each of the segmented inverter components is removably attached to the stator, such that the segmented inverter components may be replaced when they become faulty. In some examples, such as the one illustrated, four (4) segmented inverter components 202, 204, 206, and 208 are installed or implemented on the stator 110. In some examples, each segmented inverter component is implemented separately and independently of the other segmented inverter components. That is, the inverters 102 of the segmented inverter components are individually operable or controllable such that if one of the segmented inverter components is removed, there is minimal or no impact or interference to the operation of the remaining segmented inverter components. Thus, each inverter may be controlled separately such that the electric machine 200 is not limited to just a three-phase electric machine. For example, the windings A, B, and C of the first segmented inverter component 202 may be controlled with a phase shift offset with respect to the windings A, B, and C of the second segmented inverter component 204, thereby forming a six-phase inverter.

Figure 3:
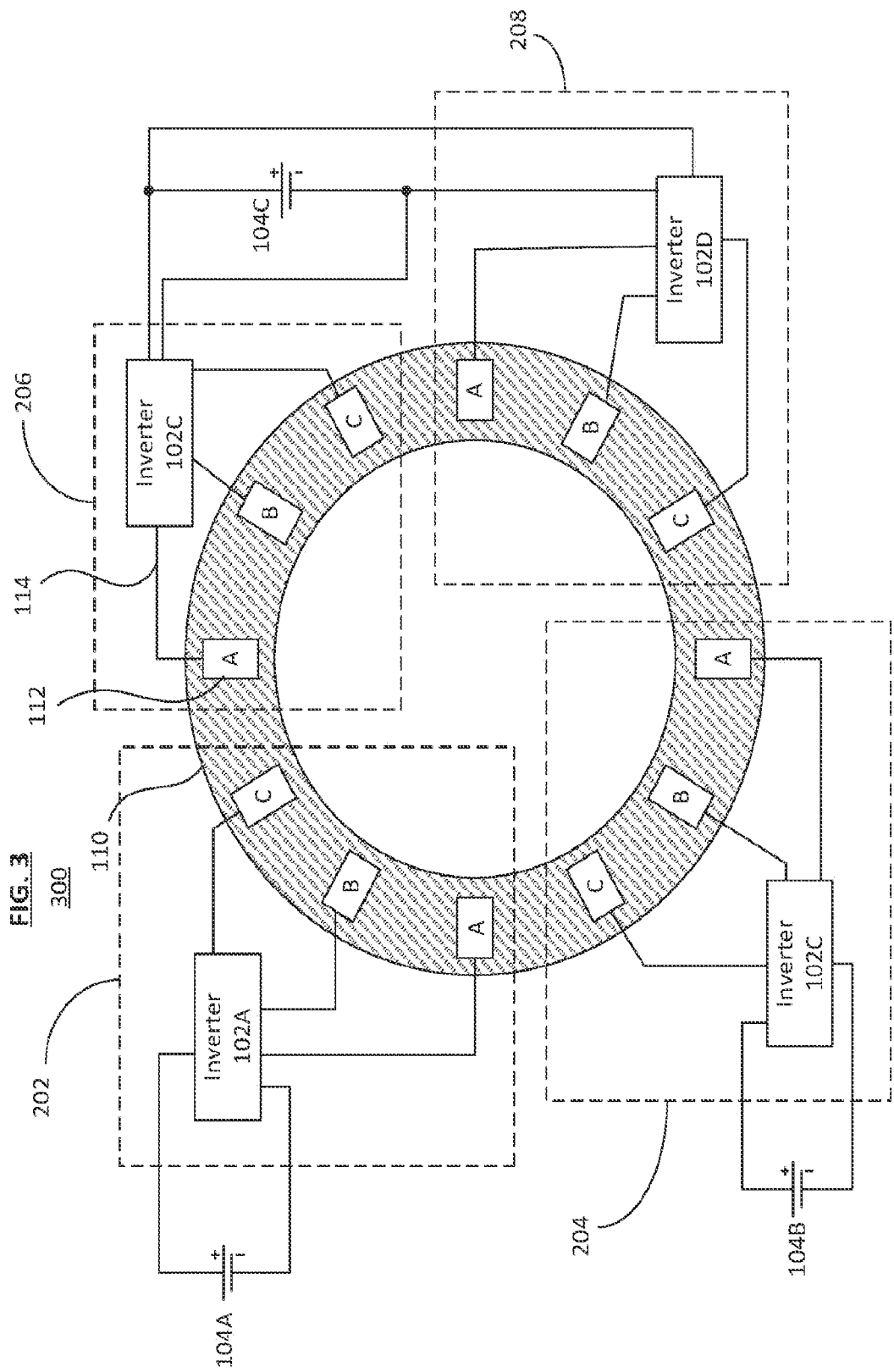
FIG. 3 is a schematic diagram of a multiphase electric machine with segmented inverter components installed on the stator according to embodiments disclosed herein.

FIG. 3 shows an example of a multiphase electric machine 300 according to embodiments disclosed herein. The electric machine 300 includes a plurality of segmented inverter components 202, 204, 206, and 208 installed or implemented on the stator 110, with a plurality of DC voltages sources 104A, 104B, and 104C providing electrical current to the inverters 102A, 102B, 102C, and 102D of the segmented inverter components. In some examples, each inverter may be coupled with a separate DC voltage source 104 that is separate and independent from the other voltage sources (for example, the voltage sources 102A and 102B provide electrical current only to inverters 102A and 102B, respectively). In some examples, two or more of the inverters may share a common DC voltage source 104 (for example, the voltage source 104C provides electrical current to both inverters 102C and 102D). in this example, the DC connection rings 210 and 212 are not required for the voltage sources 104A and 104B, but the rings may be implemented for the voltage source 104C since it provides electrical current to a plurality of inverters 102C and 102D.

It is to be understood that FIGS. 2 and 3 show some examples of the possible configurations in this disclosure. For example, there may be more than three sets of windings A, B, and C for the segmented inverter components, as required by the number of phases in the electric machine. In a six-phase electric machine, for example, there are six sets of windings A, B, C, D, E, and F, each with the appropriate phase offset. The number of windings may be limited by the number of slots in the stator as well as how many segmented inverter components are installed.

Figure 4:
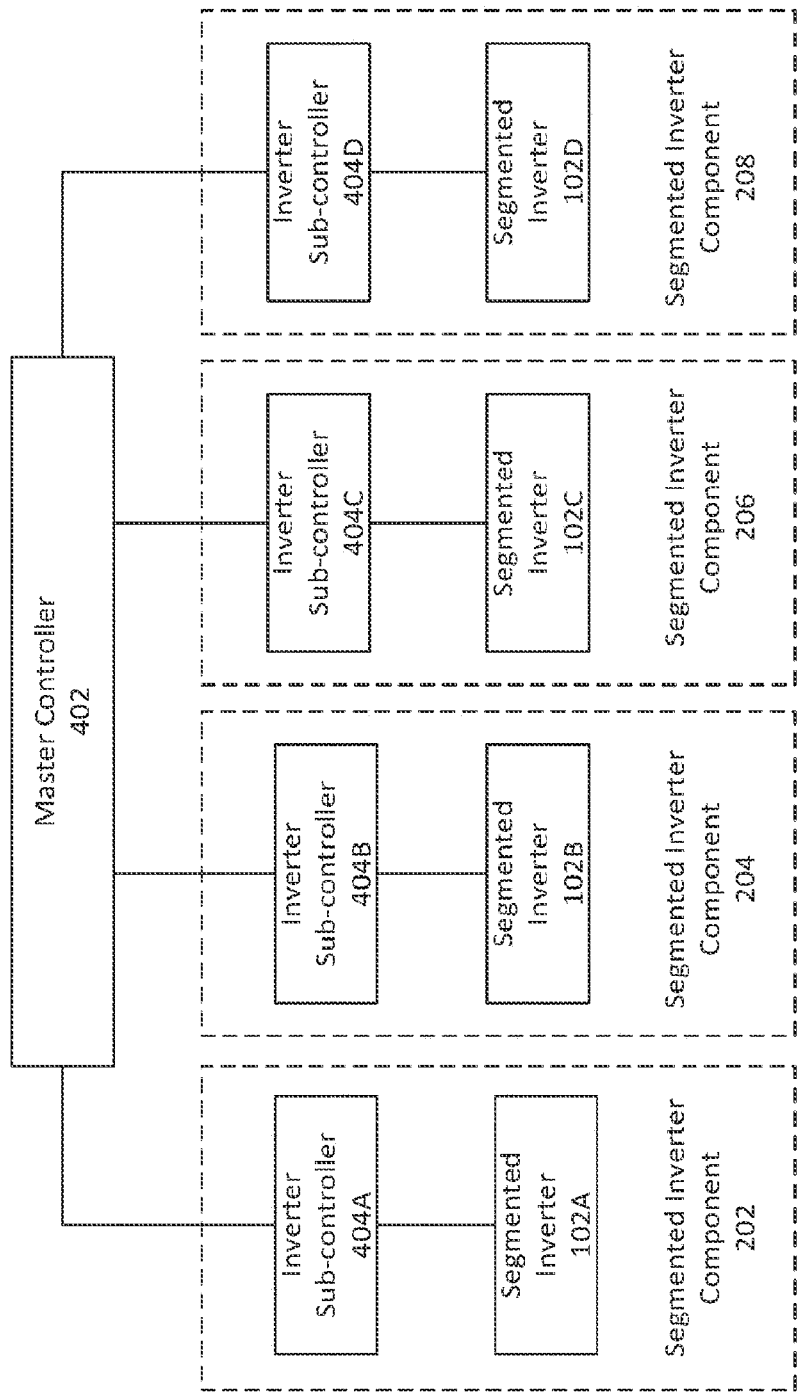
FIG. 4 is a schematic diagram of a multiphase electric machine system with a master controller and inverter sub-controllers according to embodiments disclosed herein.

FIG. 4 shows the hierarchical control system of an electric machine system 400 which includes a master controller 402 and a plurality of inverter sub-controllers 404 underneath that are controlled by the master controller 402. In the example shown, there are four (4) sub-controllers 404A, 404B, 404C, and 404D, one for each of the segmented inverters 102A, 102B, 102C, and 102D in the segmented inverter components 202, 204, 206, and 208. The master controller 402 may determine which of the inverters to be implemented together as well as the offset that are implemented to increase the number of phases in the electric machine. In some examples, the master controller 402 determines which of the segmented inverter components, if any, may be not functioning properly and/or in need of replacement. In such case, the electric machine may be run using fewer numbers of inverters than is originally installed to avoid using the inverter(s) which are determined to be not functioning properly and/or in need of replacement.

FIGS. 5A and 5B show different configurations of the electric machine according to different implementations. For example, FIG. 5A shows the electric machine 200 with four (4) segmented inverter components 202, 204, 206, and 208, whereas FIG. 5B shows an electric machine 500 with eight (8) total segmented inverter components, which includes the original segmented inverter components 202, 204, 206, and 208 as implemented in the electric machine 200 and additional segmented inverter components 502, 504, 506, and 508. Any suitable number of segmented inverter components may be installed or distributed along the perimeter of the stator 110. In some examples, one or more of the segmented inverter components may be installed as a backup inverter to replace the inverter that fails during operation.

Figure 6A:
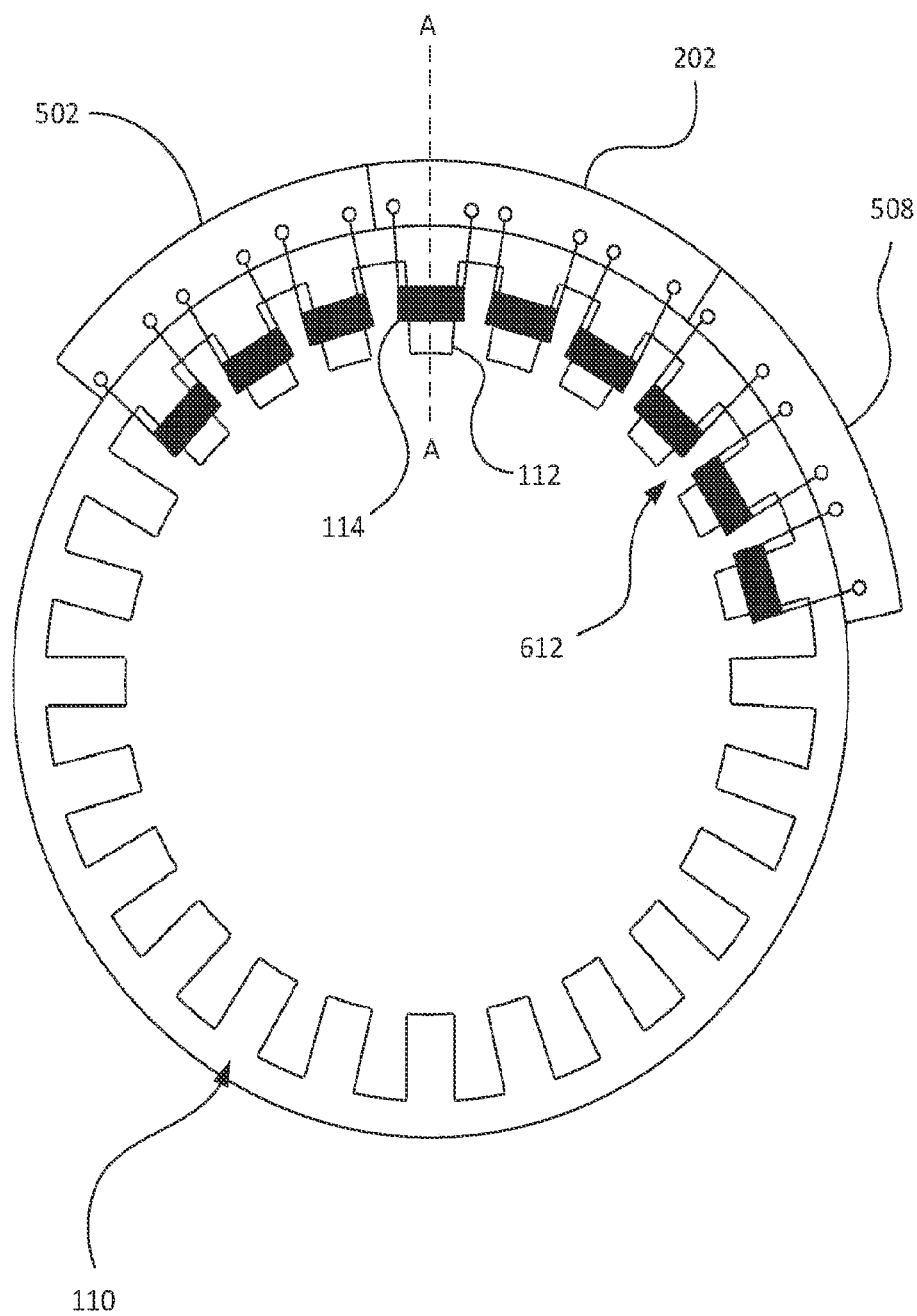
FIG. 6A is an illustration of the multiphase electric machine as disclosed in FIG. 5B.

FIG. 6A illustrates an example of how the segmented inverter components may be installed on the stator 110 in the case of the electric machine 200 with eight (8) total segmented inverter components. For simplicity, only the segmented inverter components 202, 502, and 508 are illustrated. The segmented inverter component 202 has the coil windings 114 wound around the teeth 112, where each tooth is defined between two neighboring slots 612. FIG. 6B illustrates a cross-sectional view of the segmented inverter component 202 across the broken line A-A as viewed from the side of the stator 110.

In one implementation of the segmented inverter component 202, a printed circuit board (PCB) 600 may be directly attached to or installed on the stator 112, for example at or proximal to an edge of the stator 112, such that the PCB 112 has one or more capacitors 602 and one or more other control hardware electronics or electronic components 604 on a surface(s) thereof. Any suitable number and type of electronic components may be implemented, including but not limited to power transistors, resistors, transformers, diodes, rectifiers, integrated circuits, oscillators, sensors, switches, relays, etc. The electronic components 604 form the inverter 102 which controls the electrical current flow through the coil winding 114. In some examples, the electronic components 604 define the inverter sub-controller 404 which operates the inverter 102 as controlled by the master controller 402. In some examples, the PCB 600 has some of the electronic components installed on one side while having the remaining components installed on the opposing side, to efficiently utilize the available space.

Furthermore, the segmented inverter component 202 includes a cooling jacket 606 with a coolant channel 608 defined therein to facilitate temperature control for the PCB 600. The coolant jacket 606 and the coolant channel 608 (and any suitable coolant which is transported within the coolant channel 608) may be implemented to reduce or minimize the amount of thermal transfer from the stator 110 to the PCB 600, which is heat sensitive. In some examples, the coolant jacket 606 may be made of any suitable material with low thermal conductivity, including but not limited to cement or ceramic with thermal conductivity less than about 20 $Wm^{-1}K^{-1}$, less than about 10 $Wm^{-1}K^{-1}$, less than about 5 $Wm^{-1}K^{-1}$, less than about 3 $Wm^{-1}K^{-1}$, or any other value therebetween. In some examples, the coolant jacket 606 may include a cooling pipe fluidly coupled with the coolant channel 608 for flowing coolant therethrough.

In some examples, the PCB 600 may be made of aluminum with conductive copper traces installed on a low thermal resistance dielectric layer, although any suitable configuration may be implemented. The PCB 600 of the segmented inverter component 202 is configured to receive a coil end 610 of the coil winding 114 which is wrapped around the tooth 112 of the stator 110. The other coil end of the coil winding (not shown) may be electrically connected to the neutral point connection.

FIG. 7 shows a flow chart illustrating a method 700 with the steps for controlling which inverters to operate as implemented by a controller such as the master controller 402 shown in FIG. 4. The steps may be implemented by a processing unit, such as a central processing unit (CPU) of a computer. For example, a non-transitory computer readable medium may contain instructions that, when executed by the computer, performs the steps as disclosed herein. In step 702, the controller receives a torque command ($T_{cmd}$) which indicates the amount of torque that is to be provided by the electric machine. In some examples, $T_{cmd}$ may be provided by operator input in advance or in real-time as the electric machine operates. In some examples, if the electric machine is a motor implemented in a hybrid or electric vehicle, $T_{cmd}$ may be calculated based on the predicted inclines along the path that the vehicle is traveling; for example, an increase in the inclines along the path would indicate a need to increase the torque provided by the motor.

In step 704, the controller determines a first set of electric machine control parameters to operate the electric machine and calculates a number of inverters (N) to use at the first set of control parameters to meet the torque demand at optimum efficiency. The efficiency of the electric machine may be calculated based on any one or more of the following factors: the voltage level of the voltage source (e.g. battery), the temperature of the voltage source, the torque of the electric machine, the temperature of the electric machine, the speed (rpm) of the electric machine, and/or the temperature of the inverters which operate the electric machine. The number N may be calculated by the controller based on the calculated optimum efficiency and in view of an electric machine efficiency map. An efficiency map for an electric machine is a contour plot of the electrical machine efficiency on axes of torque and speed, describing the optimum efficiency for any speed/torque combination and, in the case of the electric machine being an electric motor, represents the motor drive over a range of operating points defined by a driving cycle.

In step 706, the controller determines a number of inverters that can actually be used ($N_u$). The determination may be diagnostic or prognostic. That is, $N_u$ may be determined based on the availability of the inverters that can operate to provide the torque such that the electric machine may achieve $T_{cmd}$. In some examples, the controller predicts, based on measurement information such as torque output and/or temperature of the inverter as provided by one or more sensors operatively coupled with the inverter, whether each of the inverters is capable of providing torque as requested. In some examples, one or more of the inverters may be degraded (such as due to degraded switches/power transistors or higher internal temperature that may prevent the inverter from operating properly) so as to render the inverter(s) unlikely to provide its best performance. In some examples, one or more of the inverters may have been previously deemed to have undergone performance degradation. In any event, when one or more of the inverters is determined to be inadequate in providing the requested torque, $N_u$ is reduced accordingly based on how many of the inverters need to be disconnected or replaced.

In step 708, the controller determines whether $N_u$ is greater than or equal to N. That is, the controller determines in this step whether the number of available inverters may accommodate the number of inverters that are determined as necessary to achieve $T_{cmd}$.

If there are not enough available inverters, i.e., $N_u$ is less than N, in step 710, the controller calculates a second set of electric machine control parameters. The second set of control parameters is different from the first set as determined in step 704 because the second set is not calculated to achieve optimum efficiency that the electric machine can achieve, but to operate the electric machine with the limited number of available inverters, i.e. $N_u$. For example, the controller may derate the electric machine such that a torque that is less than $T_{cmd}$ is provided, based on the reduced availability of the inverters. In some examples, this reduction indicates a reduced speed for the electric machine, if the electric machine is implemented as a motor of a vehicle. In step 712, the controller operates the electric machine using the limited number of inverters (that is, $N_u$ inverters) with the second set of control parameters.

Alternatively, if there are enough available inverters, i.e., $N_u$ is greater than or equal to N, in step 714, the controller operates the electric machine using N inverters as determined in step 704, with the first set of control parameters to accommodate $T_{cmd}$.

Advantages of implementing the segmented inverter components as disclosed herein include the reduction or elimination of power cables or connectors in the electric machine. As such, the coil windings may be directly connected with the inverters without any additional intermediary component. Because there are fewer components that the electrical current passes through, there is lower amount of electrical loss. Furthermore, the power transistors that are implemented in the individual inverters can have smaller power ratings than if a single inverter is used to provide the electrical current. The individual inverters implemented in the segmented inverter components are also smaller than the single inverter used for the electric machine, and these inverters can be integrated with the electrical machine in some examples to form a more compact configuration than is otherwise possible.

In some examples, the electrical machine that is integrated with the segmented inverter components as disclosed reduces the number of AC power connections from the systems and thereby reduces the overall system costs for manufacture. The segmented inverter components may also reduce the size and/or the assembly cost due to the segmented inverter components being discrete components that can be manufactured and assembled separately (for example, provided as separated cartridges) in an automated system. The segmented inverter components also reduces the connection rings that need to be implemented, since the number of connection rings that couple the separate windings together (see FIG. 1) depends on the machine phases and thus increases as the number of phases increases. The segmented inverter components may be implemented with axial or radial machines.

Additional advantages include the capability to use various types of coolant in the electric machine. For example, in traditional electric machine architecture, oil cooling is not recommended due to the parasitic losses that would be caused when transferred through a conduit such as a hose for a certain distance. Therefore, in prior architectures, water or glycol cooling is preferred. In the present implementation, however, the coolant is transferred via a coolant channel within a coolant jacket, not a hose, such that the parasitic loss is reduced as oil cooling is implemented.

Furthermore, the redundancy created by implementing a plurality of segmented inverter components that can replace the functionality of one another facilitates flexibility in the operation of the electric machine, since the machine may be run on a partial system if some of the windings or segmented inverter components are determined as not operating properly. There are also reduced power losses in the system if lower power request is issued, since a portion of the segmented inverter components are simply placed on standby in such situations.

Figure 8A:
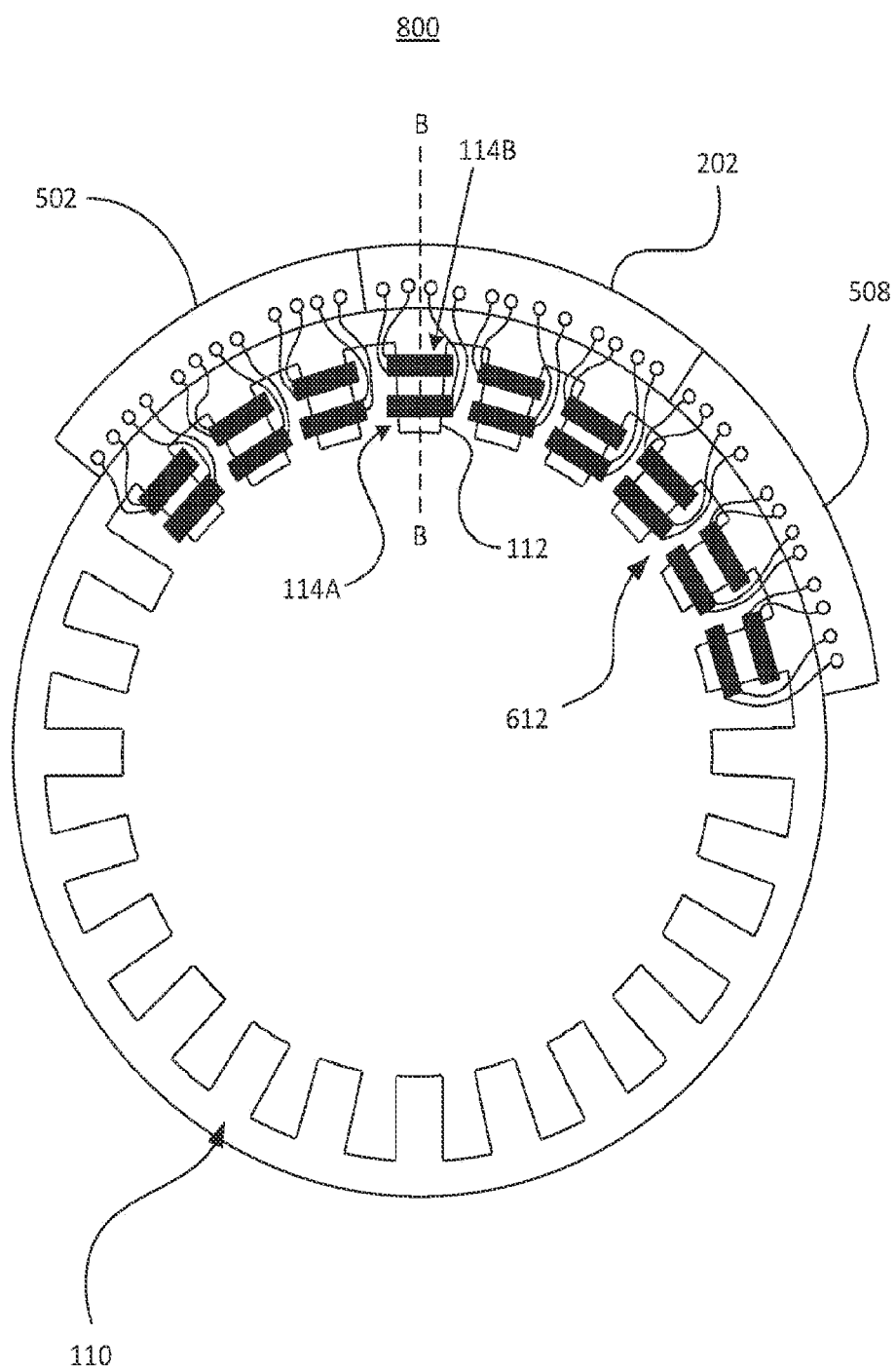
FIG. 8A is an illustration of a dual-winding multiphase electric machine according to embodiments disclosed herein.

FIGS. 8A through 8C illustrate an example of a dual-winding electric machine 800 with eight (8) total segmented inverter components, according to some embodiments. For simplicity, only the segmented inverter components 202, 502, and 508 are illustrated. Unlike the segmented inverter components in FIGS. 6A-6B which include three (3) separate coil windings associated with each component, the segmented inverter components in this example include six (6) separate coil windings associated with each component. The segmented inverter component 202 has first coil windings 114A wound around the teeth 112 and second coil windings 114B would around the same teeth (or poles) as their respective first coil windings, but disposed along a different portion or location of the common teeth. In some examples, the rotor (not shown) is positioned inside the stator 110, and the first coil windings 114A can be described as being located between the rotor and the second coil windings 114B. In some examples, the first coil winding 114A can be described as being disposed along a distal portion of the common tooth 112 (which is common to both the first coil winding 114A and the corresponding second coil winding 114B) and the second coil winding 114B can be described as being disposed along a proximal portion of the common tooth 112.

FIG. 8B illustrates a cross-sectional view of the segmented inverter component 202 across the broken line B-B as viewed from the side of the stator 110 in FIG. 8A. In addition to the components disclosed in FIG. 6B, the PCB 600 of the segmented inverter component 202 is configured to receive a first coil end 610A and a second coil end 610B of the first coil winding 114A as well as a first coil end 610C and a second coil end 610D of the second coil winding 114B, where both coil windings are wrapped around the tooth 112 of the stator 110. As such, each of the coil ends (610A through 610D) is electrically coupled with a separate connection port (A1 through A4, respectively) on the PCB 600 as shown.

FIG. 8C illustrates a portion of the dual-winding electric machine 800 showing the different connection ports A1 through A4 as located on the segmented inverter component 202. It is to be understood that similar connection ports A1 through A4 are to be located on the segmented inverter component 202 for the other coil windings as well as for the other segmented inverter components 502 and 508 as shown in FIG. 8A.

Figure 9:
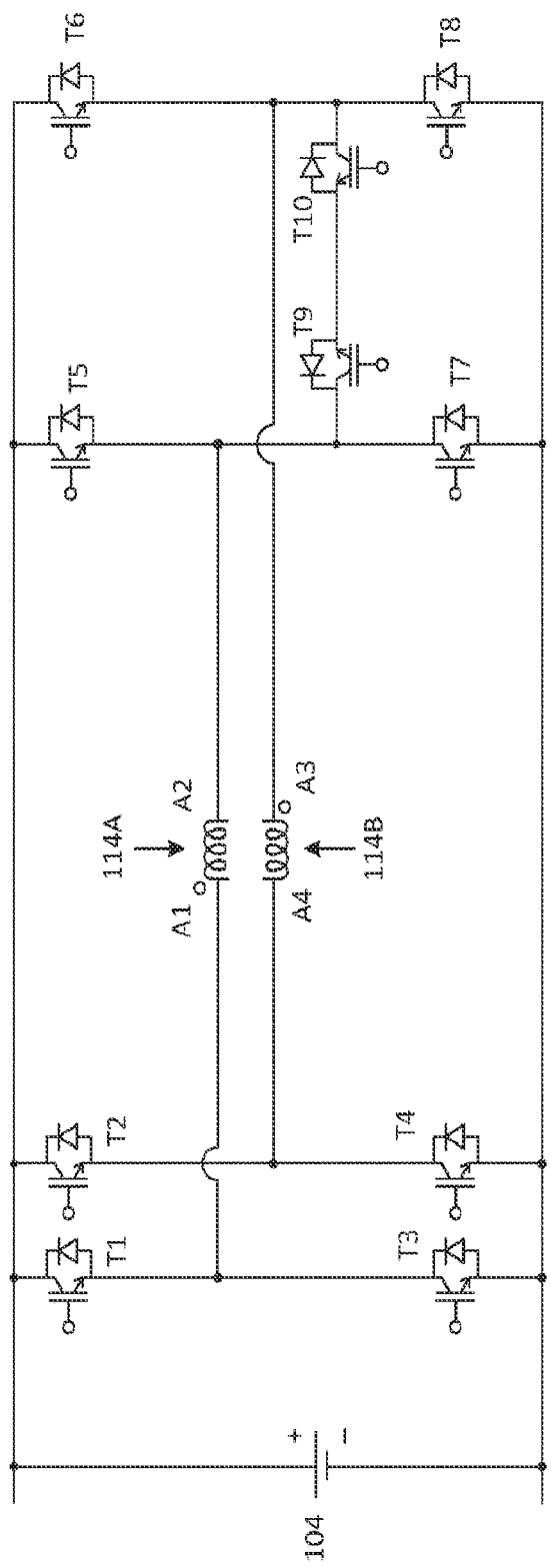
FIG. 9 is a schematic diagram of an inverter circuit architecture for controlling the dual-winding multiphase electric machine according to embodiments disclosed herein.

FIG. 9 illustrates an example of the design and components of an inverter circuit 900, which in this case may be installed on the PCB 600, when implemented in the dual-winding electric machine 800. As shown, the inverter circuit 900 includes ten (10) suitable transistors or switches T1 through T10 that are independently actuatable (to assume an open or closed position) using the suitable controller or controllers (e.g., inverter sub-controller 404A or master controller 402), the DC voltage source 104, and the dual-coil windings comprising the first coil winding 114A and the second coil winding 114B. The design of the inverter circuit 900 allows the dual-coil windings to form a series connection or parallel connection with respect to each other by controlling which transistors are actuated. Connection port A1 is electrically coupled with switch T1 or T3, and connection port A4 is electrically coupled with switch T2 or T4, depending upon which switch is activated.

For example, to form a series connection between the coil windings 114A and 114B, switches T1 through T4 are driven by pulse width modulation (PWM) patterns as working switches for the inverter, while switches T9 and T10 are permanently turned on (actuated) and switches T5 through T8 are permanently turned off (deactivated). As such, switches T5 through T8 are permanently open while switches T9 and T10 are permanently closed, causing electrical current to flow directly between connection ports A2 and A3, electrically connecting the coil windings 114A and 114B in a series connection.

To form a parallel connection, switches T1 through T8 are driven by PWM patterns as working switches for the inverter, while switches T9 and T10 are permanently turned off (deactivated). The working switches form the following pairs: T1 with T6, T2 with T5, T3 with T8, and T4 with T7, where each pair of switches has the same PWM patterns. Operating the switches according while switches T9 and T10 are permanently open, causes the coil windings 114A and 114B to operate as two coils in a parallel connection.

Figure 10:
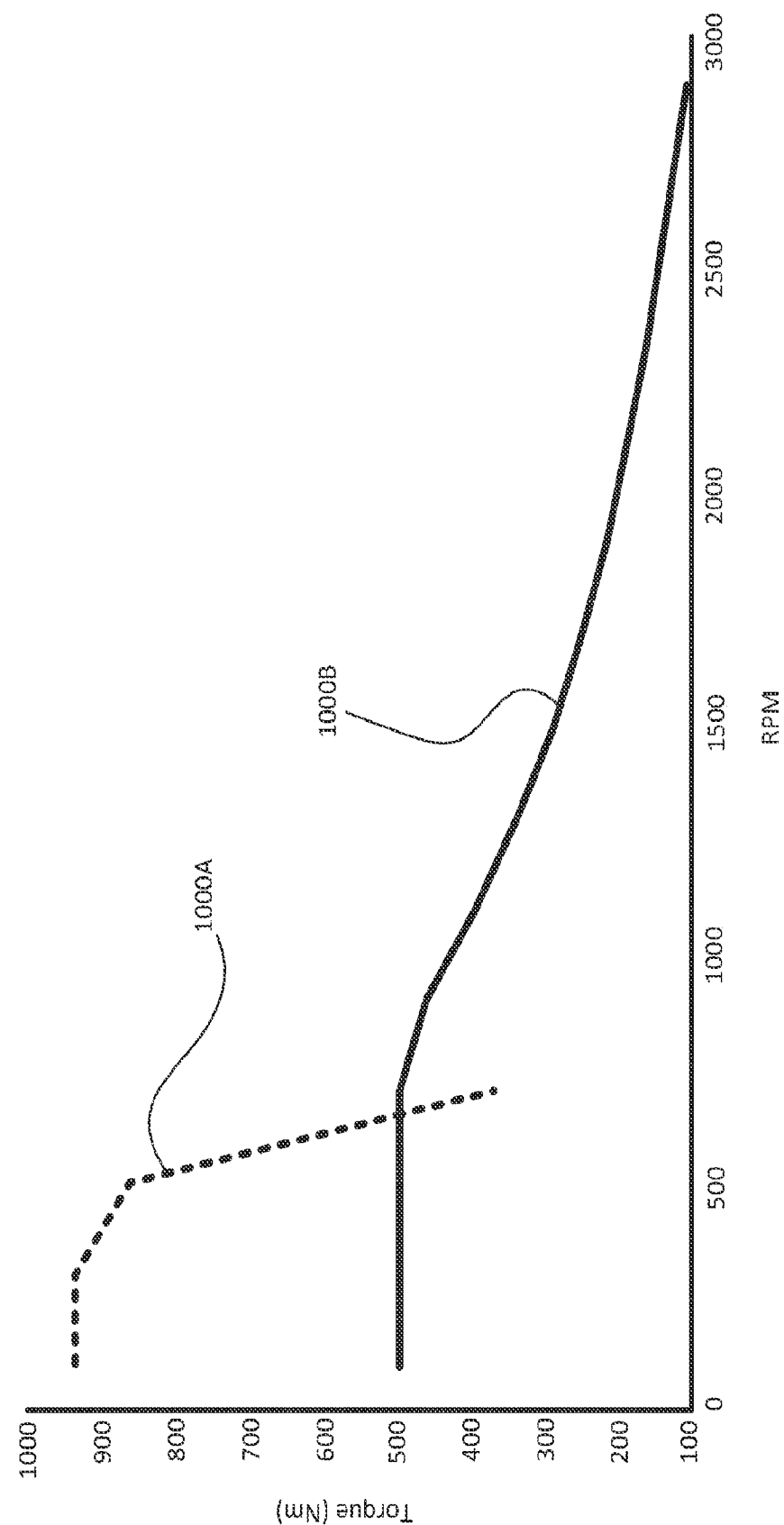
FIG. 10 is a line chart of the dual-winding machine torque as compared to the RPM according to series and parallel connections of the windings according to embodiments disclosed herein.

Benefits of implementing such dual-winding configuration include decreasing or increasing of back electromotive force (back EMF or BEMF) voltage, which is a voltage that appears in the opposite direction to current flow as a result of the motor's coils moving relative to a magnetic field, thereby increasing the flexibility of the design in different operating requirements. For example, the dual-winding electric machine can provide a two-speed machine which provides high torque when the dual windings are connected in series, thereby resulting in a high back EMF voltage which facilitates the creation of the high torque. On the other hand, when the dual winding is connected in parallel, the back EMF voltage can be reduced by half, thereby facilitating high-speed operation. As such, the dual-winding design can accommodate both high-torque and high-speed performance levels. In commercial vehicles, for example, the dual-winding design allows for twice the higher torque at a lower speed for heavier loads. This is shown in FIG. 10, where a series connection 1000A achieves twice the torque at lower speed (for example, at less than 400 RPM) as compared to a parallel connection 1000B, which is more suited for high-speed operations (for example, at greater than 1000 RPM). In some examples, the dual-winding design is capable of switching between the two connections 1000A and 1000B within milliseconds, thus providing a means for a fast and effective mode change depending on the operation of the electric machine. In some examples, the determination of switching between series connection 1000A and parallel connection 1000B may be made by the master controller 402 in response to detecting the torque command as explained herein.

Although the examples and embodiments have been described in detail with reference to certain preferred embodiments, variations and modifications exist within the spirit and scope of the disclosure as described and defined in the following claims.

What is claimed is:

1. An electric machine comprising:
a stator comprising a plurality of slots;
a plurality of segmented inverter components coupled with the plurality of slots of the stator, each segmented inverter component comprising:
an inverter, and
a set of coil windings extending from the inverter and configured to be inserted into a portion of the slots, wherein each of the segmented inverter components is separately and independently operable;
a positive DC connection ring configured to electrically couple each of es mented inverter components with a positive DC terminal of an energy source; and
a negative DC connection ring configured to electrically couple each of the segmented inverter components with a negative DC terminal of the energy source.

2. The electric machine of claim 1, wherein each of the segmented inverter components comprises:
a printed circuit board (PCB) to which the coil windings are electrically coupled; and
a coolant jacket coupled with the printed circuit board comprising a coolant channel.

3. The electric machine of claim 1, wherein each of the segmented inverter components is configured to be removably attached to the stator.

4. The electric machine of claim 1, wherein each of the segmented inverter components is configured to be separately powered by a plurality of energy storage devices.

5. The electric machine of claim 1, wherein the set of coil windings include at least a first coil winding and a second coil winding each disposed around a common stator tooth such that the first coil winding is disposed distally along the common stator tooth with respect to the second coil winding.

6. The electric machine of claim 2, wherein the PCB comprises a plurality of power transistors and control hardware electronics configured to control functionality of the inverter.

7. The electric machine of claim 5, wherein the inverter is configured such that the first and second coil windings are capable of forming either (a) a series connection of dual coils or (b) a parallel connection of dual coils.

8. An electric machine system comprising:
an electric machine comprising,
a stator com turality of slots and
a plurality of segmented inverter components coupled with the plurality of slots of the stator, each segmented inverter component comprising:
an inverter and
a set of coil windings extending from the inverter and configured to be inserted into a portion of the slots, wherein each of the segmented inverter components is separately dependently operable;
a plurality of inverter sub-controllers operatively coupled with the inverters of the plurality of segmented inverter components; and
a master controller operatively coupled with the plurality of inverter sub-controllers and configured to:
receive a torque command for the electric machine,
calculate a number of required inverters to use and a first set of control parameters based on the torque command;
identify a number of available inverters; and
in response to identifying that the number of available inverters is equal to or greater than the number of required inverters, operate, using the inverter sub-controllers, at least a portion of the segmented inverter components with the first set of control parameters to accommodate for the torque command.

9. The electric machine system of claim 8, wherein the master controller is configured to:
in response to identifying that the number of available inverters is less than the number of required inverters, calculate a second set of control parameters based on the number of available inverters; and
operate, using the inverter sub-controllers, at least a portion of the segmented inverter components with the second set of control parameters.

10. The electric machine system of claim 8, further comprising:
a plurality of energy storage devices operatively coupled with the segmented inverter components such that each of the segmented inverter components is configured to be separately powered by the plurality of energy storage devices.

11. A method of operating an electric machine, the method comprising:
receiving, by a master controller, a torque command for the electric machine, the electric machine comprising a plurality of segmented inverter components, each comprising an inverter and a set of coil windings extending from the inverter, each of the segmented inverter components being separately and independently operable;
calculating, by the master controller, a number of required inverters to use and a first set of control parameters based on the torque command;
identifying, by the master controller, a number of available inverters;
in response to identifying that the number of available inverters is less than the number of required inverters, calculating a second set of control parameters based on the number of available inverters; and
operating, by the master controller using a plurality of inverter sub-controllers, at least a portion of the segmented inverter components with the second set of control parameters.

12. The method of claim 11, further comprising:
operating the inverter to form either (a) a series connection of dual coils or (b) a parallel connection of dual coils based on the torque command.

13. An electric machine comprising:
a stator comprising a plurality of slots; and
a plurality of segmented inverter components coupled with the plurality of slots of the stator, each segmented inverter component comprising:
an inverter,
a set of coil windings extending from the inverter and configured to be inserted into a portion of the slots, wherein each of the segmented inverter components is separately and independently operable,
a printed circuit board (PCB) to which the coil windings are electrically coupled, and
a coolant jacket coupled with the printed circuit board comprising a coolant channel.

14. The electric machine of claim 13, wherein the PCB comprises a plurality of power transistors and control hardware electronics configured to control functionality of the inverter.

15. An electric machine comprising:
a stator comprising a plurality of slots; and
a plurality of segmented inverter components coupled with the plurality of slots of the stator, each segmented inverter component comprising:
an inverter, and
a set of coil windings extending from the inverter and configured to be inserted into a portion of the slots, wherein each of the segmented inverter components is separately and independently operable;
wherein each of the segmented inverter components is configured to be separately powered by a plurality of energy storage devices.

16. An electric machine comprising:
a stator comprising a plurality of slots; and
a plurality of segmented inverter components coupled with the plurality of slots of the stator, each segmented inverter component comprising:
an inverter, and
a set of coil windings extending from the inverter and configured to be inserted into a portion of the slots, wherein each of the segmented inverter components is separately and independently operable;
wherein the set of coil windings include at least a first coil winding and a second coil winding each disposed around a common stator tooth such that the first coil winding is disposed distally along the common stator tooth with respect to the second coil winding, and the first and second coil windings are capable of forming either (a) a series connection of dual coils or (b) a parallel connection of dual coils.

17. An electric machine system comprising:
an electric machine comprising:
a stator comprising a plurality of slots, and
a plurality of segmented inverter components coupled with the plurality of slots of the stator, each segmented inverter component comprising:
an inverter, and
a set of coil windings extending from the inverter and configured to be inserted into a portion of the slots, wherein each of the segmented inverter components is separately and independently operable;
a plurality of inverter sub-controllers operatively coupled with the inverters of the plurality of segmented inverter components;
a master controller operatively coupled with the plurality of inverter sub-controllers; and
a plurality of energy storage devices operatively coupled with the segmented inverter components such that each of the segmented inverter components is configured to be separately powered by the plurality of energy storage devices.

18. A method of operating an electric machine, the method comprising:
receiving, by a master controller, a torque command for the electric machine, the electric machine comprising a plurality of segmented inverter components, each comprising an inverter and a set of coil windings extending from the inverter, each of the segmented inverter components being separately and independently operable;
calculating, by the master controller, a number of required inverters to use and a first set of control parameters based on the torque command;
identifying, by the master controller, a number of available inverters;
in response to identifying that the number of available inverters is equal to or greater than the number of required inverters, operating, by the master controller using a plurality of inverter sub-controllers, at least a portion of the segmented inverter components with the first set of control parameters to accommodate for the torque command; and
operating the inverter to form either (a) a series connection of dual coils or (b) a parallel connection of dual coils based on the torque command.

\* \* \* \* \*